PISTON ASSEMBLY
Filed Aug. 13, 1962
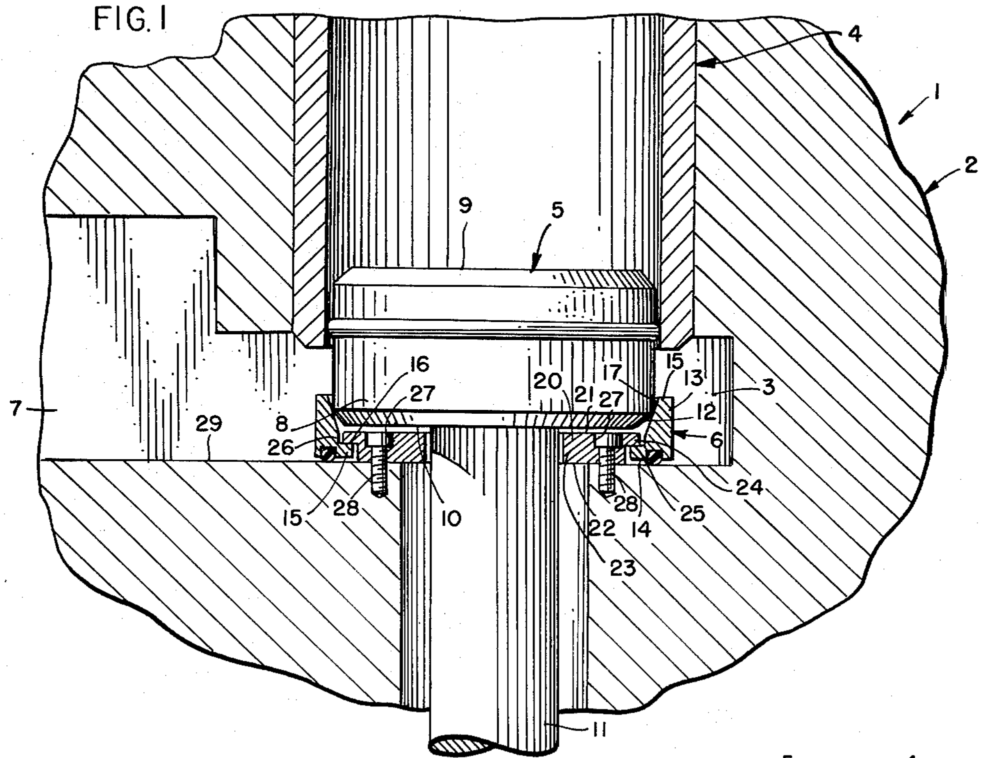
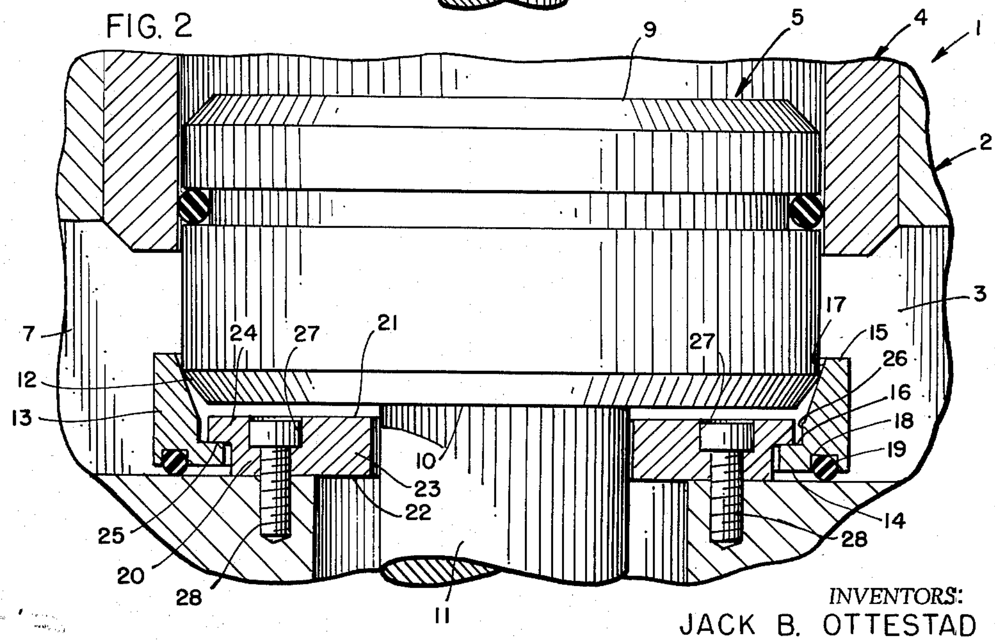
INVENTORS:
JACK B. OTTESTAD
SAMUEL A. SKEEN
BY
Marzall, Johnston, Cook & Root
ATT'YS United States Patent Office 3,202,059
Patented Aug. 24, 1965

3,202,059
PISTON ASSEMBLY

Jack B. Ottestad, La Grange, and Samuel A. Skeen, Cook County, Ill., assignors to U.S. Industries, Inc., New York, N.Y., a corporation of Delaware Filed Aug. 13, 1962, Ser. No. 216,428
7 Claims. (Cl. 91—392)

This invention relates to piston assemblies and, more particularly, to piston assemblies which are particularly well adapted for use in high pressure power units such as, for example, in high energy impact machines, and the like.

The primary object of the present invention is to afford a novel seal for pistons, and the like.

In certain power units, such as, for example, in high energy impact machines of the type shown in the co-pending application for United States Letters Patent, Serial No. 190,524, filed in the United States Patent Office on April 19, 1962, now Patent No. 3,135,140, in the names of Jack B. Ottestad and Samuel A. Skeen, as co-inventors, wherein pistons are used to drive portions of the machines, it is often desirable to effectively seal an end of such a piston, at one end of the stroke thereof, against exposure to high pressure working fluid which surrounds the piston. It is an important object of the present invention to enable the ends of such pistons to be so sealed in a novel and expeditious manner.

Seals for sealing the ends of pistons in high energy impact machines, and the like, are disclosed in the aforementioned co-pending application, Serial No. 190,524. While the seals shown in said application are practical and effective, it is an object of the present invention to afford novel improvements thereover.

Another object of the present invention is to afford a novel seal of the aforementioned type wherein the parts thereof are constituted and arranged in such a manner as to enable relatively wide ranges of machining tolerances to be used in the manufacture thereof without sacrificing efficiency or reliability of the seals in operation.

Another object is to enable novel, more reliable seals of the aforementioned type to be afforded.

Yet another object is to afford novel seals of the aforementioned type wherein the parts thereof are constituted and arranged in a novel and expeditious manner enabling the seals to be readily adjusted and replaced.

A further object is to afford a novel seal of the aforementioned type which readily adjusts itself in a novel and expeditious manner to accommodate variations in piston contour and lateral displacement of such a piston.

Another object of the present invention is to afford a novel seal of the aforementioned type wherein the parts are so constituted and arranged as to afford effective metal-to-metal contact between such a piston and the seal.

A further object is to afford a novel seal of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary longitudinal sectional view of a piston assembly in a power unit embodying the principles of the present invention; and FIG. 2 is an enlarged fragmentary sectional view of a portion of the piston assembly shown in FIG. 1.

A portion of a power unit 1, embodying the principles of the present invention is shown in the drawings to illustrate the preferred embodiment of the present invention. The power unit 1 may be any suitable type of power unit such as, for example, a power unit embodied in a high energy impact machine of the general type shown in the aforementioned co-pending application, Serial No. 190,524. The power unit 1 includes, in general, a supporting member 2 having a pressure chamber 3 therein; a cylinder 4, having one end opening into the pressure chamber 3; a piston 5 reciprocably mounted in the cylinder 4; and a sealing ring 6 mounted in the supporting member 2 in position to sealingly engage the piston 5 at one end of the stroke of the piston 5 in the cylinder 4, as will be discussed in greater detail presently.

The supporting member 2 may be any suitable type of supporting member such as, for example, a movable plate or die embodied in a high energy impact machine of the type shown in the aforementioned application, Serial No. 190,524. In such machines, working fluid, such as, for example, a suitable gas, is fed into the pressure chamber 3 through a suitable passageway, such as, for example, the passageway 7. The pressure of such gases in the chamber 3 are commonly relatively high, such as, for example, in the nature of 2,000 pounds per square inch, and in the operation of such a power unit the high pressure gas in the chamber 3 is utilized to provide an acceleration force to accelerate the piston 5 upwardly in the cylinder 4, as viewed in FIGS. 1 and 2, while, at the same time, the pressurized gas in the chamber 3 provides an equal acceleration force acting in the opposite direction to accelerate the cylinder 4 and the supporting member 2 in a downward direction, as viewed in FIGS. 1 and 2.

Subsequently in the operation of the power unit 1, after the piston 5 has completed its upward stroke, it moves downwardly relative to the cylinder 4 and the supporting member 2 into position wherein the lower end portion 8 thereof projects downwardly into the chamber 3 and is disposed in sealed engagement with the sealing ring 6, as will be discussed in greater detail presently.

The piston 5 shown in the drawings has an upper face 9 and a lower face 10, with an elongated, substantially straight mounting post or a connecting rod 11 attached to and projecting downwardly from the lower face 10 in axial alignment with the piston 5. The piston 5 is circular in transverse cross section and includes a tapered seat surface 12 at the lower end thereof, the seat surface 12 being substantially frusto-conical in shape and sloping upwardly and outwardly away from the lower face 10.

The sealing ring 6 includes an annular seat member 13 having a bottom face 14 and an upper face 15. The bottom face 14 is preferably substantially flat, and the annular seat 13 includes an annular, radially inwardly projecting flange 15 at the lower end portion thereof, the flange 15 having an upper face 16 which is preferably substantially parallel to the face 14. The annular seat 13 also includes a substantially frusto-conical shaped seat surface 17 disposed above the flange 15 in upwardly spaced relation thereto. The seat surface 17 projects upwardly and outwardly away from the flange 15 and terminates at its upper end at the upper face 15 of the inner seat 13. The bottom face 14 of the annular seat 13 has an annular groove or recess 18 extending therearound, and a resilient annular sealing ring 19, made of suitable material, such as, for example, rubber, neoprene, or the like, is mounted in the groove 18 and projects downwardly from the lower face 14.

The sealing ring 6 also includes an annular retainer ring 20, having substantially flat, parallel upper and lower faces 21 and 22, respectively. The retainer ring 20 includes an annular main body portion 23 and an annular flange 24 projecting radially outwardly from the upper end portion of the main body portion 23. The flange 24 has a flat lower face 25, which is preferably disposed in parallel relationship to the upper face 21 of the retainer ring 20.

The annular seat 13 and the retainer ring 20 may be made of any suitable material such as, for example, steel and are of such size that the retainer ring 20 may be disposed in the annular seat 13 with the lower face 25 of the flange 24 resting on the upper face 16 of the flange 15 in parallel juxtaposition thereto, and with the outer peripheral edge of the flange 24 spaced radially inwardly from the radially inwardly facing, cylindrical shaped portion 26 of the annular seat 13 disposed between the seat surface 17 and the flange 15. The flange 24 is preferably of such thickness that the upper face 21 of the retainer ring 20 is disposed in uniplanar relation to the lower edge of the seat surface 17 when the flange 24 is disposed in abutting engagement with the upper face 16 of the flange 16, as shown in FIGS. 1 and 2.

The internal diameter of the flange 15 on the annular seat 13 is greater than the outer diameter of the main body portion 23 of the retainer ring 20 below the flange 24. Thus, it will be seen that with the inside diameter of the portion 26 of the annular seat 13 greater than the outside diameter of the flange 24, and with the inside diameter of the flange 15 greater than the outside diameter of the body portion 23, when the annular seat 13 and the retainer ring 20 are disposed in assembled relation to each other, with the flange 24 disposed in overlying relation to the flange 15, the annular seat 13 and the retainer ring 20 may be shifted radially relative to each other. The flange 24 is of such outside diameter, and the flange 15 is of such inside diameter, that they remain in overlapped relation to each other throughout their circumferences in all radially shifted positions of the annular seat 13 relative to the retainer ring 20.

The retainer ring 20 has a plurality of countersunk openings 27 extending therethrough radially inwardly of the flange 24, and suitable fastening members such as, for example, screws or bolts 28 may be extended through the openings 27 and threaded into the supporting member 2 for releaseably securing the retainer ring 20 to the supporting member 2. The bolts 28 preferably are so disposed in the supporting member 2 that they are effective to tightly clamp the lower face 22 of the retainer ring 20 against the lower wall 29 of the pressure chamber 3 in parallel juxtaposition thereto.

The main body portion 23 of the retainer ring 20 is of such thickness, axially of the retainer ring 20, that when the retainer ring 20 is thus clamped in operative position against the wall 29, and the upper face 16 of the flange 15 on the inner seat 13 is disposed in abutting engagement with the lower face 25 on the flange 24 of the retainer ring 20, the lower face 14 of the annular seat 13 is disposed in upwardly spaced relation to the wall 29. The sealing ring 19 in the groove 18 in the lower face 14 of the annular face 17 is preferably of such thickness that when the sealing ring 6 is disposed in such operative position on the wall 29 of the pressure chamber 3 that it is effective to maintain a seal even when the annular seat 13 shifts radially relative to the retainer ring 20.

In the power unit 1, the sealing ring 6 is disposed on the wall 29 of the pressure chamber 3 in circumscribing relation to the longitudinal axis of the piston 5 and the mounting post 11. It is so disposed relative to the lower end of the downward stroke of the piston 5 that when the piston 5 is disposed at the lowermost end of its downward stroke, the seating surface 12 thereon is disposed in firmly seated, sealing engagement with the seating surface 17 of the annular seat 13, with the lower face 10 of the piston 5 disposed in upwardly spaced relation to the upper face 21 of the retainer ring 20. The taper of the seat surface 12 on the lower end portion of the piston 5 is sufficiently greater than the taper of the seat surface 17 of the annular seat 13, such as, for example, one to five degrees greater, as to insure firm sealing at the outer perimeter or edge of seat surface 12.

With this arrangement, positive metal-to-metal sealing engagement between the piston 5 and the annular seat 13 is insured. The transverse, radial adjustability of the annular seat 13 relative to the retainer ring 20 enables the annular seat 13 to shift radially to accommodate minor deflections in the movement of the piston 5 or deformities in the periphery thereof. Of course, as will be appreciated by those skilled in the art, any such variations in the piston 5 are relatively small, being in the nature of minute fractions of an inch. However, they may be of sufficient magnitude that if no provision is made for corresponding adjustment of the sealing ring 6, the desired effective sealing will not be effected between the piston 5 and the sealing ring, and could result in damage to the piston 5 or the sealing ring 6.

When the piston assembly shown in the accompanying drawings is used in a high energy impact machine, or the like, high pressure is normally built up in the pressure chamber 3 while the piston 5 is disposed in seated engagement with the sealing ring 6. Thereafter, the piston 5 is commonly moved upwardly by an external pressure applied to the mounting post 11 to thereby permit the flow of the high pressure gas into the space between the sealing ring 6 and the lower face 10 of the piston 5. The force supplied by the gas to the lower face 10 of the piston 5 is effective to cause the aforementioned upward movement of the piston 5 relative to the cylinder 4 and the supporting member 2. Thereafter, when the piston 5 again moves downwardly in the cylinder 4, the high pressure in the chamber 3 has been relieved and is not again built up until after the piston 5 is disposed in firmly seated engagement with the sealing ring 6.

From the foregoing, it will be seen that the present invention affords a novel sealing ring for pistons, and the like, which is highly practical and efficient in construction and operation.

In addition, it will be seen that the present invention affords a novel sealing ring which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. In a power unit embodying a supporting member having a pressure chamber therein, means for feeding working fluid under pressure into said chamber, and a cylinder having one end in communication with said chamber, (a) a piston reciprocable in said cylinder through a predetermined stroke, (b) said piston having two end faces, and (c) sealing means mounted on said supporting member for sealing one end face of said piston against fluid pressure in said chamber, (d) said sealing means comprising (1) a retainer ring mounted on said supporting member, and (2) an annular seat held on said supporting member by said retainer ring in position to engage said piston, (e) said annular seat being transversely movable relative to said retainer ring.

2. In a power unit embodying a supporting member having a pressure chamber therein, means for feeding working fluid under pressure into said chamber, and a cylinder having one end in communication with said chamber, (a) a piston reciprocable in said cylinder through a predetermined stroke, (b) said piston having two end faces, and (c) sealing means mounted on said supporting member for sealing one end face of said piston against fluid pressure in said chamber at one end of said stroke, (d) said sealing means comprising (1) a retainer ring mounted on said supporting member adjacent said one end of said stroke, and (2) an annular seat (a') projecting radially inward into said retainer ring, and (b') clamped thereby in position to sealingly engage said piston around said one face at said one end of said stroke.

3. In a power unit embodying a supporting member having a pressure chamber therein, means for feeding working fluid under pressure into said chamber, and a cylinder having one end in communication with said chamber, (a) a piston reciprocable in said cylinder through a predetermined stroke, (b) said piston having two end faces, and (c) sealing means mounted on said supporting member for sealing one end face of said piston against fluid pressure in said chamber at one end of said stroke, (d) said sealing means comprising (1) a retainer ring (a') mounted on said supporting member adjacent said one end of said stroke and (b') having an annular, radially outwardly projecting flange disposed in spaced relation to said supporting member, and (2) an annular seat (a') disposed in position to sealingly engage said piston in surrounding relation to said one face at said one end of said stroke, and (b') having an annular, radially inwardly projecting flange, (e) said flange on said retainer ring being disposed in overlying engagement with said flange on said annular seat in position to hold said seat on said supporting means, and (f) said seat being movable relative to said retainer ring transversely of said stroke of said piston.

4. In a power unit embodying a supporting member having a pressure chamber therein, means for feeding working fluid under pressure into said chamber, and a cylinder having one end in communication with said chamber, (a) a piston reciprocable in said cylinder through a predetermined stroke, (b) said piston having two end faces, and (c) sealing means mounted on said supporting member for sealing one end face of said piston against fluid pressure in said chamber at one end of said stroke, (d) said sealing means comprising (1) a retainer ring (a') mounted on said supporting member adjacent said one end of said stroke and (b') having an annular, radially outwardly projecting flange disposed in spaced relation to said supporting member, and (2) an annular seat having (a') an end face, (b') an annular, radially inwardly projecting flange adjacent to said last-mentioned end face, and (c') a substantially frusto-conical shaped seating surface sloping outwardly away from said last-mentioned flange, (e) said flange on said annular seat being disposed between said supporting member and said flange on said retainer ring in position to hold said supporting member in position to dispose said seating surface in position to sealingly engage said piston in surrounding relation to said one surface at said one end of said stroke, and (f) said annular seat being radially movable relative to said retainer ring.

5. The combination defined in claim 4, (a) and which includes a resilient sealing ring (1) mounted in said end face of said annular seat (2) in sealing engagement with said supporting member and said last-mentioned end face, and (b) in which said annular seat is movable axially toward and away from said flange on said retainer ring.

6. A sealing ring for sealingly engaging a piston and comprising (a) an annular seat having (1) a substantially frusto-conical shaped seating surface for sealingly engaging such a piston, and (2) an annular, radially inwardly projecting flange, and (b) a retainer ring removable from said annular seat and having an annular radially outwardly projecting flange disposed in position to retainingly overly said flange on said seat for holding said seat in position for said seating surface to so engage such a piston.

7. A sealing ring for sealingly engaging a piston, and the like, said ring comprising (a) an annular retainer ring having (1) a body portion and (2) an annular, radially outwardly projecting flange (b) an annular seat having (1) an outwardly sloping, substantially frusto-conical shaped seating surface, and (2) an annular, radially inwardly projecting flange disposed adjacent to the smaller end of said seating surface, (c) said flange on said annular seat being disposed in underlying engagement to said first-mentioned flange in circumscribing relation to said body portion, and (d) an annular sealing ring mounted in and projecting axially from said annular seat on the opposite side of said second-mentioned flange from said seating surface.

References Cited by the Examiner

UNITED STATES PATENTS

| | | | |
|---|---|---|---|
| 1,903,775 | 4/33 | Christopher. | |
| 2,882,869 | 4/59 | Krapf | 309—2 |
| 2,944,522 | 7/60 | Doyle. | |
| 3,027,875 | 4/62 | Spencer. | |

FRED E. ENGELTHALER, *Primary Examiner.*

RICHARD B. WILKINSON, *Examiner.*